Patented May 12, 1942

2,282,941

UNITED STATES PATENT OFFICE 2,282,941

TREATMENT OF RUBBER

Clyde Coleman, Montclair, N. J., assignor to United States Rubber Company, New York, N. Y., a corporation of New Jersey No Drawing. Application February 28, 1939,
Serial No. 258,957

17 Claims. (Cl. 260—800)

This invention relates to the treatment of rubber and similar oxidizable materials, and more particularly to a new class of deterioration retarders.

An object of the invention is to provide a new class of anti-oxidants or age resistors for organic substances which tend to deteriorate by absorption of oxygen from the air, for example, goods of rubber or allied gums, unsaturated fatty oils such as unsaturated vegetable oils, essential oils, petroleum oils and their derivatives such as gasolines, soaps, aldehydes, synthetic resins, turpentine, paints and varnishes containing drying oils, and the like. Further objects will be apparent from the following description.

According to the invention, rubber and the like as aforesaid is treated with a compound having the general formula

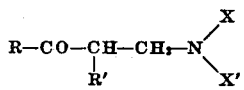

where N is a nitrogen atom; X and X' are aliphatic hydrocarbon groups which may be joined to form a closed ring; R is an alkyl or aryl radical; and R' is hydrogen or an alkyl, aryl or aralkyl radical. The group comprising

may also be considered as the residue of a secondary amine of aliphatic or N-heterocyclic character (i. e., where the N-atom is a part of the ring) obtained by removal of the hydrogen from the nitrogen of the secondary amine. The chemicals may be called N-disubstituted alpha-amino beta-acyl ethanes. Typical examples are N-beta-benzoyl-ethyl piperidine

N-dimethyl alpha-amino beta-acetyl ethane

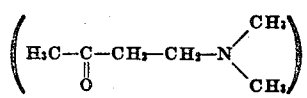

alpha-piperidyl beta-benzoyl beta-methyl ethane

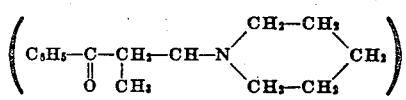

The halogen acid salts of these compounds may be made in known manner by the interaction of a ketone, formaldehyde, and the halogen acid salt of a secondary amine of aliphatic or of heterocyclic character, and liberation of the desired free base from the reaction product with alkali. Their preparation is illustrated by the formation of N-beta-benzoyl-ethyl piperidine from acetophenone, formaldehyde, and piperidine hydrochloride, according to the following reactions:

$C_6H_5.CO.CH_3 + CH_2O + HNC_5H_{10}.HCl$

↓

$C_6H_5.CO.CH_2.CH_2.NC_5H_{10}HCl + H_2O + NaOH$

↓

$C_6H_5.CO.CH_2CH_2.NC_5H_{10} + H_2O + NaCl$

It is seen that the methylene group derived from the formaldehyde forms a bridge between the phenacyl group ($C_6H_5.CO.CH_2-$) and the amine residue.

Another example, this time derived from an open-chain secondary amine, is N-beta-benzoyl-propyl diethylamine

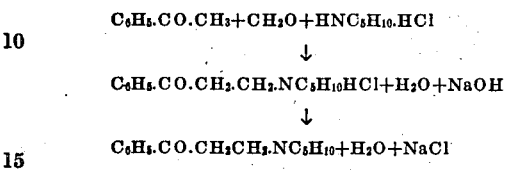

prepared by the interaction of proprionphenone ($C_6H_5.CO.CH_2.CH_3$), formaldehyde, and diethylamine hydrochloride.

The compounds may likewise be made from other secondary amines, for example, dimethyl amine, dipropyl amines, dibutyl amines, diamyl-amines, di-cyclohexyl amine; homologs of piperidine; morpholine; thiazine; piperazine (the latter requiring two moles each of formaldehyde and of aryl alkyl ketone per mole of piperazine); pyrrol, and basic homologs thereof; tetra-hydrocarbazole, etc. Mixed dialkylamines such as methyl ethyl amine may also be used.

From the reaction equation above it is seen that in the aryl-alkyl ketones the reactive point is the labile hydrogen atom on the aliphatic carbon atom adjacent to the carbonyl group. Accordingly, the reacting alkyl group of the aryl-alkyl ketones or the dialkyl ketones employed may be either primary or secondary alkyl, but may not be tertiary alkyl. Examples of suitable ketones are acetophenone, propiophenone, butyrophenone, iso-butyrophenone, acetone, ethyl-methyl ketone, methyl-iso-propyl ketone, etc., also phenyl-benzyl ketone, in which case R' in the general formula will be aryl.

The invention is not to be restricted to the use of compounds made by the above disclosed methods only. The compounds may also be prepared, for example, by the reaction of a beta-aroyl or alkoyl alkyl halide with a secondary amine of the type described above, e. g., the reaction of piperidine with chloro-1-benzoyl-2-ethane ($C_6H_5.CO.CH_2CH_2Cl$).

A third method of preparation for the open-chain compounds is the alkylation of the corresponding primary amino-aroyl or alkoyl ethanes on the nitrogen, by means of alkyl esters; e. g., $$C_6H_5.CO.CH_2CH_2.NH_2 + 2C_2H_5BR \rightarrow$$
$$C_6H_5.CO.CH_2CH_2.N(C_2H_5)_2 + 2HBr$$

Still another method, applicable to the preparation of the heterocyclic type containing the 2,5-dimethyl-pyrryl group, consists in the condensation of acetonyl-acetone with a primary amino-aroyl-ethane, e. g.

$$C_6H_5.CO.CH_2CH_2.NH_2 + CH_3.CO.CH_2.CH_2.CO.CH_3$$

$$\longrightarrow C_6H_5.CO.CH_2CH_2.N \begin{matrix} CH_3 \\ | \\ C=CH \\ | \\ C=CH \\ | \\ CH_3 \end{matrix} + 2H_2O$$

Whether made by any of the above methods or by any others, the aryl nucleus of the aroyl group may have substituents, such as alkyl, alkoxy, aryloxy, hydroxyl, halogeno, etc.

Not only are the compounds of the invention capable of retarding the deterioration of vulcanized rubber exposed to deteriorating conditions, but it has also been found that white or light-colored rubber articles containing these chemicals do not become discolored as much as rubber articles containing most conventional antioxidants.

The effectiveness of these compounds as antioxidants is illustrated by the following tests:

A base stock (A) containing

| | Parts by weight |
|---|---|
| Pale crepe | 100 |
| Zinc oxide | 20 |
| Lithopone | 50 |
| Stearic acid | 2 |
| Sulfur | 3 |
| Tetramethyl thiuram monosulfide | 0.15 | was prepared. To portions of the base stock were added, respectively, (B) N-beta-benzoyl-ethyl dimethyl amine, (C) N-beta-benzoyl-ethyl piperidine, and (D) N-beta-benzoyl-ethyl morpholine, in amounts corresponding to one part of added chemical per 100 of rubber. These four stocks were cured in molds at 25 pounds steam pressure, for 60 minutes. They were then tensiled unaged, and also after being aged 96 hours in oxygen under a pressure of 300 pounds per square inch at a temperature of 70° C. The following table shows the tensile data obtained (lbs./sq. in.):

| | Stock | | | |
|---|---|---|---|---|
| | A (control) | B | C | D |
| Unaged | 3,410 | 2,932 | 3,039 | 3,145 |
| Aged | Too poor | 2,160 | 2,305 | 2,346 |

The invention may be applied to the preservation of natural rubbers as well as artificially prepared rubbers, including reclaims and latices of such rubbers.

It is also to be understood that other desired filling and compounding ingredients may be incorporated along with the preservative, for example, in the case of rubber, there may be incorporated other accelerators, softeners, etc.

The antioxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the anti-oxidant may vary from about 0.1% to 5%, although either smaller or greater proportions may be found useful. If the material to which it is added is a liquid such as rubber cement or an oil, the antioxidant may be dissolved therein in a suitable small proportion. The antioxidant may be incorporated into solid substances by milling or mastification, and prepared for incorporation into dispersions or solutions either in powder, paste or solution form, or applied in such forms for incorporation by diffusion, to the surfaces of vulcanized or unvulcanized rubber goods.

Having thus described my invention, what I claim and desire to protect by Letters Patent is:

1. A process of inhibiting the deterioration of organic substances which tend to deteriorate by absorption of oxygen from the air which comprises treating the same with an N-disubstituted alpha-amino beta-acyl ethane having the general formula $$R-CO-CH-CH_2-N\begin{matrix} X \\ \\ X' \end{matrix}$$
$$\quad\quad\quad |$$
$$\quad\quad\quad R'$$

where N is nitrogen; X and X' represent disubstituents on the nitrogen selected from the group consisting of aliphatic hydrocarbon radicals, and aliphatic hydrocarbons that are part of a heterocyclic ring of which the said nitrogen is a member; R is a radical selected from the group consisting of an aryl, and an alkyl radical; and R' is a radical selected from the group consisting of hydrogen, an aryl, and an alkyl radical.

2. A process of preserving rubber which comprises incorporating therein an N-disubstituted alpha-amino beta-acyl ethane having the general formula $$R-CO-CH-CH_2-N\begin{matrix} X \\ \\ X' \end{matrix}$$
$$\quad\quad\quad |$$
$$\quad\quad\quad R'$$

where N is nitrogen; X and X' represent disubstituents on the nitrogen selected from the group consisting of aliphatic hydrocarbon radicals, and aliphatic hydrocarbons that are part of a heterocyclic ring of which the said nitrogen is a member; R is a radical selected from the group consisting of an aryl, and an alkyl radical; and R' is a radical selected from the group consisting of hydrogen, an aryl, and an alkyl radical.

3. A process of inhibiting the deterioration of organic substances which tend to deteriorate by absorption of oxygen from the air which comprises treating the same with an N-disubstituted beta-aroyl-ethylamine in which the disubstituents are aliphatic hydrocarbon groups.

4. A process of inhibiting the deterioration of organic substances which tend to deteriorate by absorption of oxygen from the air which comprises treating the same with an N-disubstituted beta-aroyl-ethylamine in which the disubstituted nitrogen atom is joined to two aliphatic hydrocarbon radicals.

5. A process of inhibiting the deterioration of organic substances which tend to deteriorate by absorption of oxygen from the air which comprises treating the same with an N-substituted beta-aroyl-ethylamine in which the disubstituted nitrogen atom is joined to two alkyl radicals.

6. A process of inhibiting the deterioration of organic substances which tend to deteriorate by absorption of oxygen from the air which comprises treating the same with an N-disubstituted beta-aroyl-ethylamine in which the disubstituted nitrogen atom is part of a heterocyclic ring.

7. A process of inhibiting the deterioration of organic substances which tend to deteriorate by absorption of oxygen from the air which comprises treating the same with an N-disubstituted beta-aroyl-ethylamine in which the disubstituted nitrogen atom is the nitrogen atom of a piperidine group.

8. A process of inhibiting the deterioration of organic substances which tend to deteriorate by absorption of oxygen from the air which comprises treating the same with an N-disubstituted beta-aroyl-ethylamine in which the disubstituted nitrogen atom is the nitrogen atom of a morpholyl group.

9. An organic substance which tends to deteriorate by absorption of oxygen from the air containing an N-disubstituted alpha-amino beta-acyl ethane having the general formula

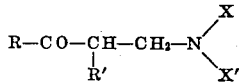

where N is nitrogen; X and X' represent disubstituents on the nitrogen selected from the group consisting of aliphatic hydrocarbon radicals, and aliphatic hydrocarbons that are part of a heterocyclic ring of which the said nitrogen is a member; R is a radical selected from the group consisting of an aryl, and an alkyl radical; and R' is a radical selected from the group consisting of hydrogen, an aryl, and an alkyl radical.

10. A vulcanization product of rubber containing an N-disubstituted alpha-amino beta acyl ethane having the N-disubstituted alpha-amino beta-acyl ethane having the general formula

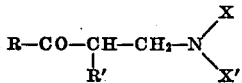

where N is nitrogen; X and X' represent disubstituents on the nitrogen selected from the group consisting of aliphatic hydrocarbon radicals, and aliphatic hydrocarbons that are part of a heterocyclic ring of which the said nitrogen is a member; R is a radical selected from the group consisting of an aryl, and an alkyl radical; and R' is a radical selected from the group consisting of hydrogen, an aryl, and an alkyl radical.

11. A rubber composition containing an N-disubstituted alpha-amino beta-acyl ethane having the general formula

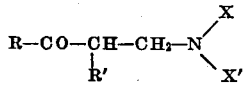

where N is nitrogen; X and X' represent disubstituents on the nitrogen selected from the group consisting of aliphatic hydrocarbon radicals, and aliphatic hydrocarbons that are part of a heterocyclic ring of which the said nitrogen is a member; R is a radical selected from the group consisting of an aryl, and an alkyl radical; and R' is a radical selected from the group consisting of hydrogen, an aryl, and an alkyl radical.

12. An organic substance which tends to deteriorate by absorption of oxygen from the air containing N-beta-benzoyl-ethyl piperidine.

13. An organic substance which tends to deteriorate by absorption of oxygen from the air containing N-beta-benzoyl-ethyl morpholine.

14. An organic substance which tends to deteriorate by absorption of oxygen from the air containing N - beta-benzoyl - ethyl dimethylamine.

15. A rubber composition containing N-beta-benzoyl-ethyl piperidine.

16. A rubber composition containing N-beta-benzoyl-ethyl morpholine.

17. A rubber composition containing N-beta-benzoyl-ethyl dimethylamine.

CLYDE COLEMAN.